United States Patent [19]
Biferno et al.

[11] Patent Number: 5,530,650
[45] Date of Patent: Jun. 25, 1996

[54] COMPUTER IMAGING SYSTEM AND METHOD FOR REMOTE IN-FLIGHT AIRCRAFT REFUELING

[75] Inventors: Michael A. Biferno, Duarte; Craig H. Durck, Lake Forest, both of Calif.

[73] Assignee: McDonnell Douglas Corp., Huntington Beach, Calif.

[21] Appl. No.: 344,412

[22] Filed: Nov. 21, 1994

Related U.S. Application Data

[63] Continuation of Ser. No. 968,052, Oct. 28, 1992, abandoned.

[51] Int. Cl.$^6$ ................................................ B64D 39/00
[52] U.S. Cl. ................ 364/460; 244/135 A; 244/161; 340/958; 348/117
[58] Field of Search ................ 364/460, 461, 364/462; 244/135 A, 161; 348/116, 117; 33/286; 382/54; 345/139, 157; 340/958; 395/135

[56] References Cited

U.S. PATENT DOCUMENTS

| | | | |
|---|---|---|---|
| 3,910,533 | 10/1975 | Cheatham et al. | 244/161 |
| 4,027,403 | 6/1977 | Marsh et al. | 348/116 |
| 4,298,176 | 11/1981 | Kendall | 244/135 A |
| 4,349,837 | 9/1982 | Hinds | 348/116 |
| 4,395,005 | 7/1983 | Ganssle | 244/161 |
| 4,398,685 | 8/1983 | Task et al. | 244/135 A |
| 4,408,943 | 10/1983 | McTamaney et al. | 244/161 |
| 4,646,244 | 2/1987 | Bateman et al. | 364/461 |
| 4,890,918 | 1/1990 | Monford | 244/161 |
| 4,975,696 | 12/1990 | Salter, Jr. et al. | 364/460 |
| 5,109,345 | 4/1992 | Dabney et al. | 244/161 |
| 5,111,400 | 5/1992 | Yoder | 364/461 |
| 5,131,438 | 7/1992 | Loucks | 244/135 A |
| 5,153,836 | 10/1992 | Fraughton et al. | 364/461 |
| 5,207,003 | 5/1993 | Yamada et al. | 33/286 |
| 5,302,816 | 4/1994 | Tulet | 244/161 |
| 5,313,201 | 5/1994 | Ryan | 364/461 |

OTHER PUBLICATIONS

NASA Tech Briefs, Official Publication of NASA, Mar. 1991, pp. 26, etc.
McDonnell Douglas publication, author, date and pages unknown.

*Primary Examiner*—Kevin J. Teska
*Assistant Examiner*—Tyrone V. Walker

[57] ABSTRACT

A visual guidance system and method includes a subsystem which both locates the aircraft and mating structures thereof and also determines their motion and their rate of change of motion. The locating subsystem has an electrical output which feeds the location and motion data to a guidance system computer which utilizes software which combines the data with other data in a database containing the dimensional size and configuration of the aircraft and mating structures. The combined data is converted to a suitable form and fed to the computer monitor which displays the aircraft and mating structures thereof in real time during the refueling operation. The computer and computer monitor are provided with image controls which allow the operator to select the perspective viewing angle as well as the image contrast and color in order to enhance the visual cues provided by the image and facilitate the refueling operation.

19 Claims, 12 Drawing Sheets

COMPUTER IMAGING SYSTEM AND METHOD FOR REMOTE IN-FLIGHT AIRCRAFT REFUELING

This is a continuation, of application Ser. No. 07/968,052, filed Oct. 28, 1992, now abandoned.

This application incorporates subject matter comprising an optical position, range and rate determination subsystem which is described and claimed in a commonly owned and simultaneously filed application U.S. Ser. No. 07/999,768 by applicants James B. Blackmon and Kenneth W. Stone entitled "Digital Image System For Determining Relative Position and Motion of In-Flight Vehicles".

BACKGROUND OF THE SPECIFICATION

The present invention relates generally to visual guidance systems and, more particularly, to visual guidance systems used to facilitate mating of a refueling boom on a tanker aircraft with a boom receptacle on a receiving aircraft to enable inflight refueling of the receiving aircraft.

Inflight aircraft refueling operations utilizing the boom system presents numerous difficulties for the boom operator. In refueling operations utilizing the boom system, the tanker aircraft is flown in a level flight path while the receiver aircraft is flown into a desired position to enable proper mating of the aircraft boom and receiver aircraft receptacle. The boom is swivably mounted to the tanker aircraft and is telescopically extendable to refueling structures require the boom operator to have a good view of both the refueling structures and the aircraft. Both indirect and direct viewing of the orientation and range of the aircraft refueling structures utilized in the refueling operations may often take place under adverse viewing conditions such as a low contrast/high glare environment which may be due to a bright undercast. Under such conditions, visual cues may be distorted resulting in errors in depth perception.

Some prior art direct viewing systems require the boom operator to lie prone in the rear of the tanker aircraft where he has a direct out-the-window view of the boom and receiver aircraft. However, refueling operations in such a prone position are very fatiguing to the boom operator. In addition to being required to frequently perform these operations under adverse environment conditions, the operators view through the window is very limited.

Some prior art indirect viewing systems utilize 3-D glasses to provide depth cues. Use of these glasses is associated with eye fatigue, frequent loss of steropsis i.e., loss of fusion and 3-D perception, and a phenomena known as pseudomovement i.e., the perceived shifting of the visual field in nonlinear fashion with incremental head motion. An example of such a system is disclosed in U.S. Pat. No. 4,298,176 to Kendall.

Some prior art systems have been designed which utilize nuclear radiation source and detection equipment in the tanker and receiver aircraft to enable the boom operator to perform the link up operations without a direct or indirect view of the refueling structures or aircraft. An example of such a system is disclosed in U.S. Pat. No. 3,285,544 to Chope et al. The Chope system utilizes a cobalt or other radiation source in the tanker aircraft and nuclear detection equipment in the receiver aircraft. The direction sensitive detector equipment provides azimuth, elevation and range information by means of an oscillographic display. A primary disadvantage of this type of system is the difficulty faced by the operator in using dot representations on a screen to guide the aircraft and refueling structures into the desired mating position.

Other prior art systems use optical systems to determine the location and range of the receiver aircraft relative to the tanker aircraft and the boom. Examples of such systems are disclosed in U.S. Pat. Nos. 4,025,193 and 3,917,196 both to Pond et al. The Pond systems use an optical source on the tanker aircraft to transmit a light beam which is reflected by suitably positioned reflectors on the receiver aircraft and the boom. An optical sensor on the tanker aircraft determines azimuth, elevation and range of the receiver aircraft and the boom and feeds this information to a computer and to a cathode ray tube rectangular coordinate display. The relative positions are thus displayed as dots on a screen. Consequently, as with the Chope system, the Pond systems have the disadvantage of being very difficult to effectively use because they do not provide a realistic depiction of the aircraft and structures thereof used in refueling link up operations.

Other prior art systems use an optical array on one aircraft to communicate relative motion, range and position to the pilot of the other aircraft. An example of such a system is disclosed in U.S. Pat. No. 4,158,885 to Neuberger. The Neuberger system incorporates panels of lights mounted on the underbelly of the tanker aircraft. The lights are selectively illuminated and/or strobed to signal to the pilot of the receiver aircraft the fore-aft, up-down and right-left position as well as the fore-aft rate of the two aircraft. A primary disadvantage with these systems is that pilot instructions given by such light signals are difficult to follow with any high degree of precision. In addition, there is significant chance of pilot error in interpreting the light signals which can potentially result in a collision. Furthermore, such a system does not aid the boom operator in mating the boom with the boom receptacle.

A guidance system is thus needed that can provide the pilot and boom operator with a realistic, real time depiction of the refueling structures and aircraft. A guidance system is also needed that provides a high degree of precision in link up of refueling aircraft while being easy to use and allowing minimal chance of error.

SUMMARY OF THE INVENTION

It is a principal object of the present invention to provide an improved system and method for guiding desired structures of aircraft or spacecraft into a desired mating position.

It is another object of the present invention to provide a system and method for guiding aircraft refueling structures into a desired mating position.

It is also another object of the present invention to provide a system and method for guidance of aircraft refueling structures into a desired mating position which provides a realistic depiction of the desired structures and aircraft.

It is an object of the present invention to provide a system and method for guidance of aircraft structures into a desired mating position which provides selection of desired perspective views of the depiction in the image provided by the system and method in order to enhance visual cues provided by the image to thereby facilitate the guidance.

It is an object of the present invention to provide a system and method for guidance of aircraft structures into a desired mating position which provides a real time depiction of the desired structures and aircraft.

It is also an object of the present invention to provide a system and method for guidance of aircraft refueling structures into a desired mating position which allows alteration of the image provided by the system and method in order to selectively enhance visual cues provided and to thereby facilitate the guidance.

It is also an object of the present invention to provide a system and method for guidance of aircraft refueling structures into a desired mating position which is simple and easy to use.

Essentially the system and method of the present invention depicts the refueling structures and one of the aircraft on a computer display monitor. The present invention utilizes a subsystem for both locating the position and range of the aircraft and determining the motion of the structures and aircraft relative to each other. The information provided by the subsystem is fed into a computer which has software which converts the information into a suitable coordinate system e.g., Cartesian or polar, for display on the computer monitor. The computer also has a data base which contains sufficient structural dimensional details of the aircraft and refueling structures thereof to enable the computer software to combine the position and motion information from the subsystem with the data base information so as to yield a highly accurate depiction of the aircraft and structures (and their relative positions and motion) in the computer monitor image.

By using the system and method of the present invention, the refueling boom operator (or other person who is piloting or controlling the guidance operation) is able to view a clear, generally realistic image of the desired refueling structures and aircraft during the guidance operation. The image is not compromised by adverse weather conditions, improper viewing angle, glare caused by adverse sun position and inclusion of more structural details of the refueling structures and aircraft than ideally needed to properly perform the guidance operation. Furthermore, since the present invention provides a generally realistic (although artificially created) view of the pertinent structures and aircraft, the operator does not have to use his or her imagination to visualize (i.e., mentally construct from electronic dials, data or meters,) relative position, orientation and motion of the pertinent structures and aircraft.

Image controls are provided which allow the operator to select the viewing angle which provides the best perspective of the operation in order to facilitate proper performance of each particular phase of the guidance operation. Thus, for example, the operator is able to see a side view of the pertinent structures and aircraft which would be the best perspective for visually determining the separation distances between the aircraft and/or relevant structures thereof; such a perspective view could not be provided by prior art direct or indirect view systems and methods. Other image controls are also provided which allow selective control of the image characteristics such as, for example, color, contrast, lighting and texture. The operator is thus able to choose the image characteristics which emphasize or enhance those aircraft structures and background field thereby facilitating discernment of the relative position of the aircraft or aircraft structures.

Since the operator is able to view the aircraft and aircraft structures from any desired viewing angle, there is no need for the operator to additionally have a direct view of the pertinent structures and aircraft. Consequently, the operator need not be placed proximal the boom but may instead be placed in the cockpit where the operator may perform other needed functions as well.

DETAILED DESCRIPTION OF THE PREFERRED EMBODIMENT

Figure 1:
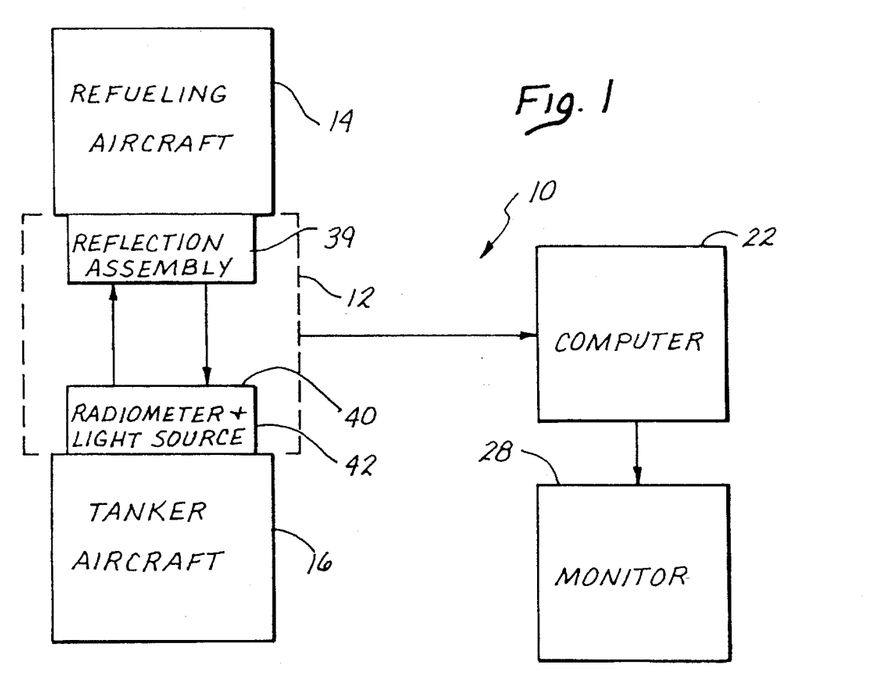
FIG. 1 is a block diagram of a computer imaging system for remote inflight refueling formed in accordance with the invention.
Figure 2:
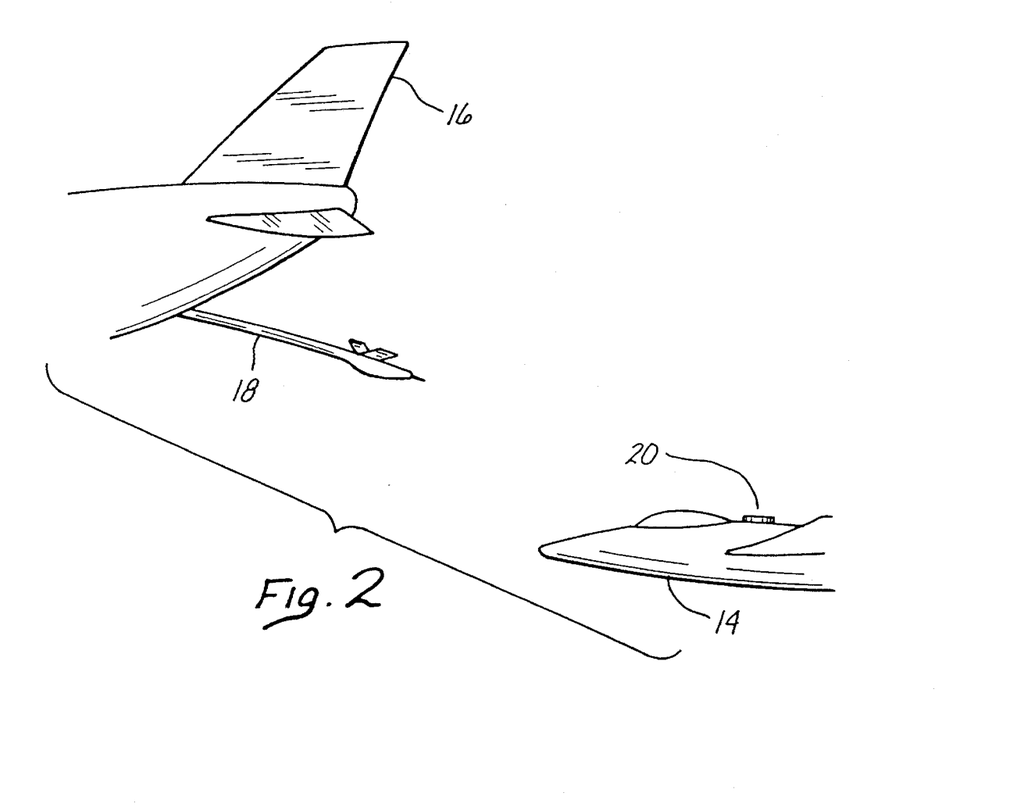
FIG. 2 is a side elevation view of a tanker aircraft with refueling boom in the process of link up with a receiver aircraft.
Figure 3:
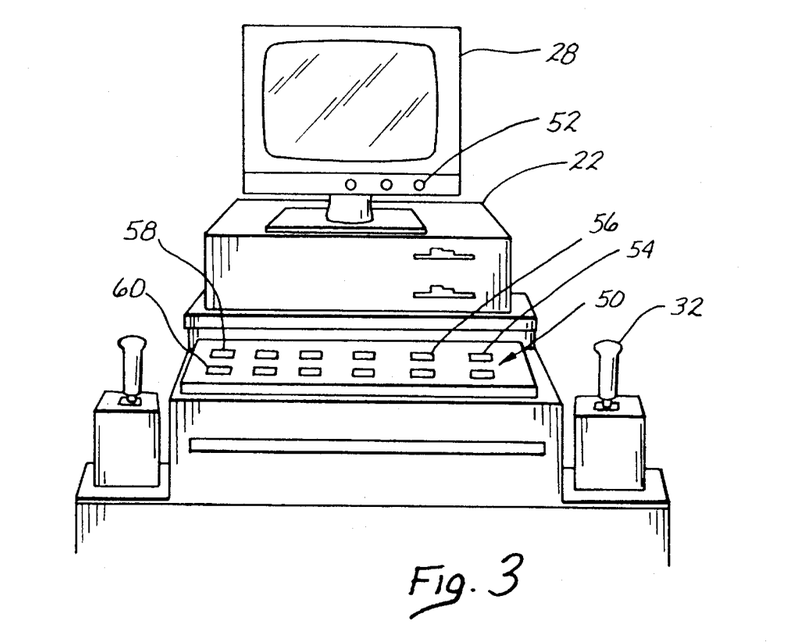
FIG. 3 is a perspective view of the refueling boom operator's console showing the boom hand controls and the monitor control panel.
Figure 4A:
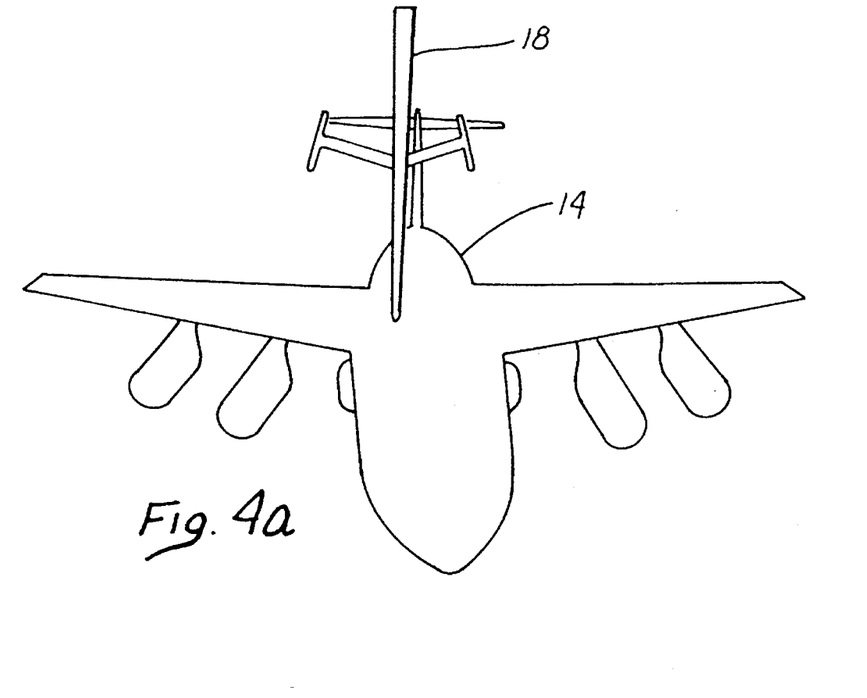
FIG. 4a is a view of an image provided by the system of the invention depicting the receiving aircraft and the refueling boom with the aircraft and the boom having a generally plain image texture for simplification of these depictions.
Figure 4B:
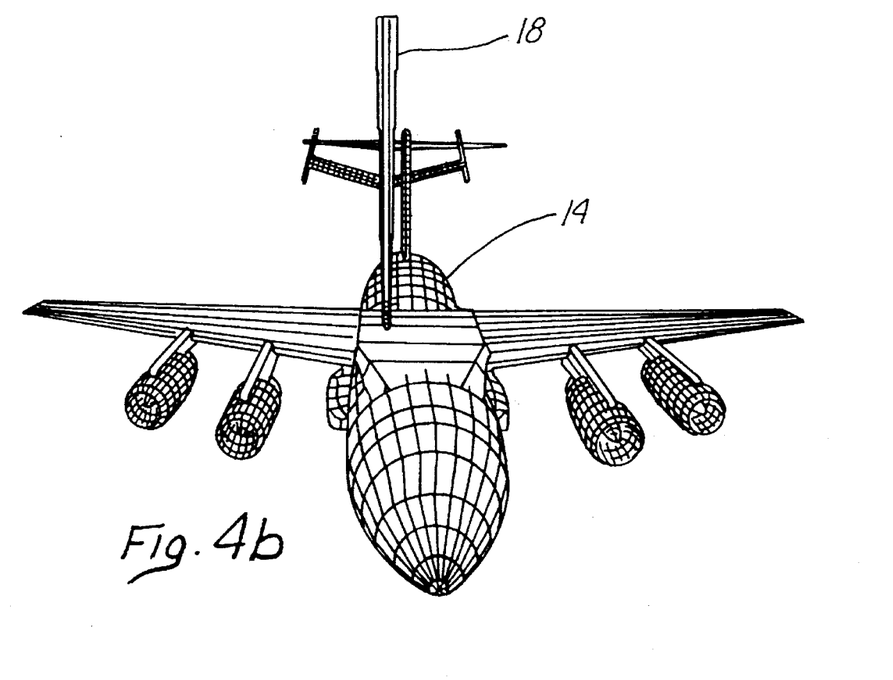
FIG. 4b is a view of another image provided by the system of the invention depicting the receiving aircraft and the refueling boom with the image texture of the aircraft and boom selected to depict a wireframe image of the aircraft and refueling structures surfaces.

Referring to the drawings, FIG. 1 shows the system of the present invention generally designated by the numeral 10. The system 10 includes a locating means 12 for locating or determining the orientation, range and motion of a receiving aircraft 14 relative to a tanker aircraft 16 as well as the orientation, range and motion of the refueling boom 18 relative to the aircraft 14 and 16 and relative to a boom receptacle 20 on the receiving aircraft 14. Thus, the locating means 12 provides data that includes the range of the receiving aircraft 14 and the rate at which it is closing in on or moving away from the tanker aircraft 16. The locating means 12 additionally provides data that includes the receiving aircraft's roll, pitch and yaw motion. The locating means 12 has an electrical output so that it can provide the spatial information in electrical form to a computer 22 via an electrical cable or other suitable transmitting means 24. The locating means 12 will be described in detail hereinbelow.

Figure 5:
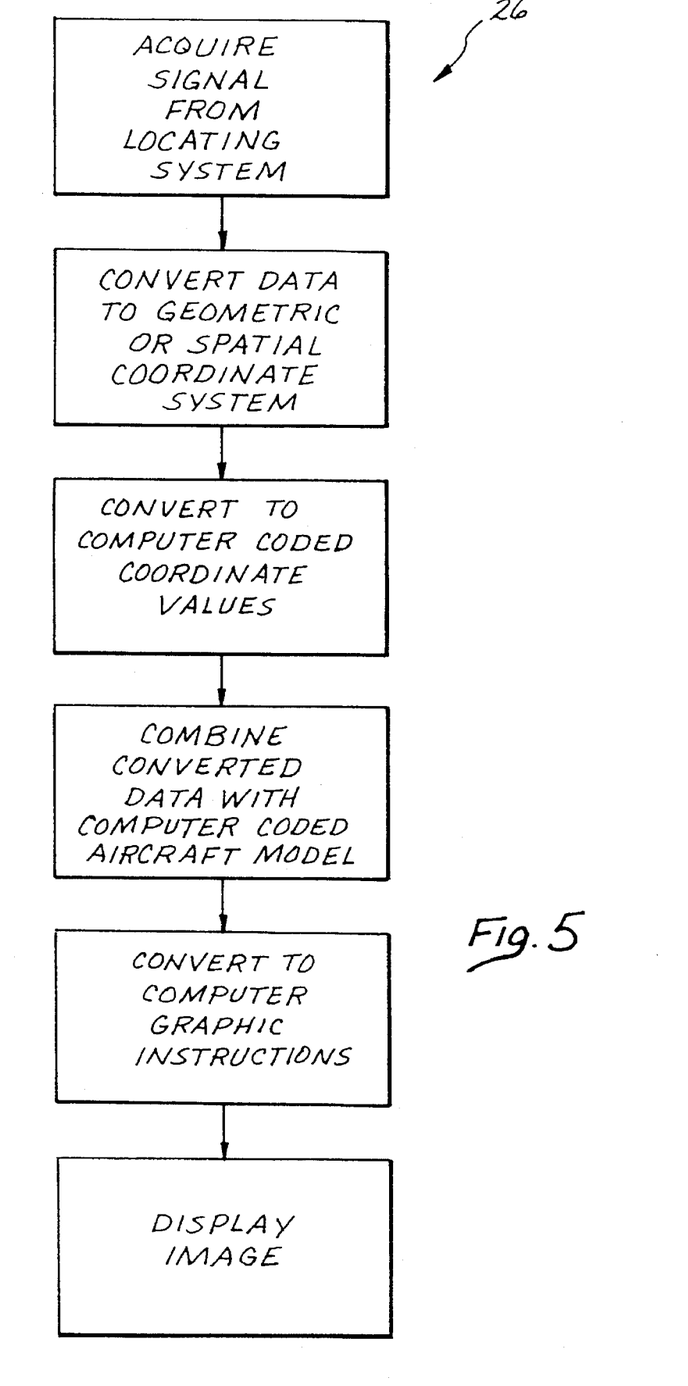
FIG. 5 is a flow chart of the computer software program of the invention which produces the real time, three dimensional geometry that can be electronically displayed.

The computer 22 incorporates a software program 26 so that the spatial information received from the locating means 12 can be displayed as an image on a computer monitor 28. As shown in FIG. 5, the software 26 converts the spatial information data from the locating means 12 into spatial information data using a geometric or spatial coordinate reference system. The data is subsequently converted into computer coded data. The computer also includes a data base 30 which preferably includes not only the dimensional size of the structures 18 and 20 and aircraft 14 and 16 but also the three dimensional size of all aircraft and refueling structures deemed likely to be involved in refueling operations. The information contained in the data base 30 is preferably sufficient to provide a generally three dimensional representation of the aircraft and refueling structures including all desired structural details thereof on the computer monitor 28. The software 26 combines the data from the locating means 12 with the data from the data base and converts the result into computer graphic instructions to display an image on the computer monitor 28 which is a generally realistic depiction of the receiving aircraft 14 and refueling structures 18 and 20. In addition, the software 26 generally conforms the dimensional size and configuration of the aircraft and structures thereof with the range data and rate of range change data to produce a depiction of both relative size and rate of change in the relative size of the aircraft and structures thereof in accordance with what is currently taking place in the refueling operation. Moreover, the software 26 also generally conforms the dimensional size and configuration data of the aircraft and structures thereof with the orientation data and rate of change of orientation data from the locating means 12 to produce a depiction of both relative orientation and rate of change in the relative orientation in accordance with what is currently taking place in the refueling operation. Thus, the image on the monitor 28 is a generally accurate and realistic depiction of the aircraft and refueling structures, and the image is presented in 3-D having the parameters of range, distance from the tanker aircraft, orientation and motion provided by the locating means 12. Furthermore, the image depicts the aircraft and structures having these values in approximately real time so that the boom operator can respond in a timely manner to the information provided by the image.

Since generally all the position, range and motion information required to bring the refueling structures into a mating position is provided to the boom operator by the computer monitor image, there is no need for the operator to have a direct view of the aircraft and structures thereof which are involved in the refueling operation.

Consequently, the boom operator need not be in a prone position in the belly of the tanker aircraft 16 (as with conventional systems) but may instead be in the cockpit where the operator is more comfortable and is able to perform other operations as well. Thus, the boom operator preferably is provided with manual boom controls 32 which are preferably positioned proximal the computer monitor 26 for easy access thereto.

Figure 6:
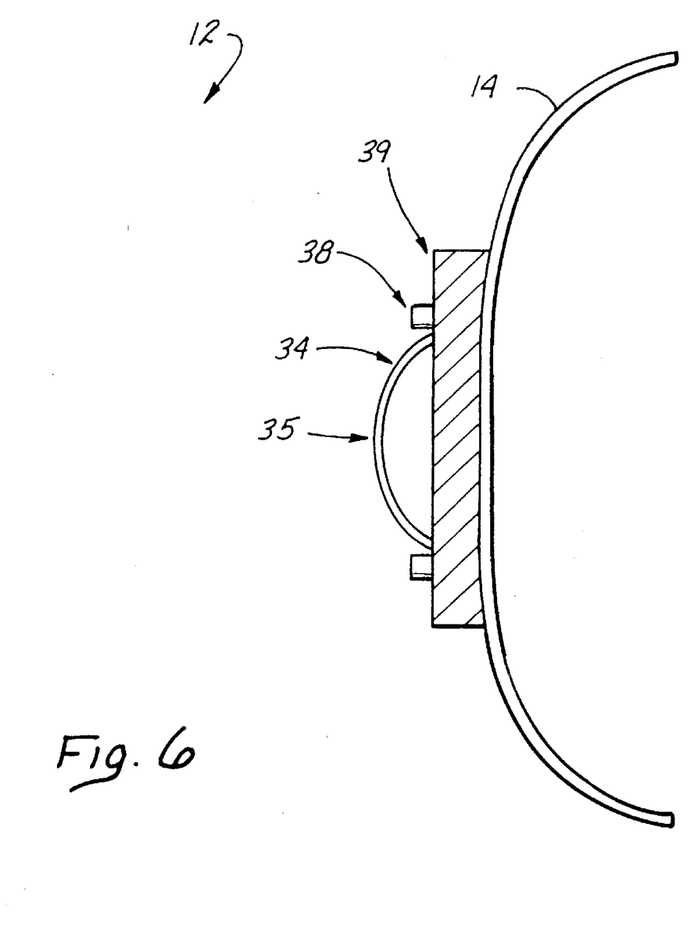
FIG. 6 is a top diagrammatic view of the locating subsystem incorporated in the invention showing the components thereof mounted on opposing surface portions of the aircraft.

The locating means 12 preferably utilizes a reflector assembly 39 which includes a mirror 34, roll retroreflectors or calibration markers 36 and pitch and yaw retroreflectors or calibration markers 38. The locating means also preferably utilizes an electromagnetic radiation source 40, a video camera 42, a video monitor 44, a beam splitter 45, a locating system computer 46 and a locating system computer monitor 48. The electromagnetic radiation (preferably in the visible light spectrum) source 38 and radiation source control 37 are preferably mounted in or on the tanker aircraft 16 and shines a preferably radial beam onto the mirror 34 which is preferably mounted on the receiver aircraft 14. Optionally, the source 38 may be a plurality of sources in order to increase data points and enhance accuracy of the system. The video camera 42 is preferably mounted on the tanker aircraft 16 and positioned so that it receives light reflected from the mirror 34.

The mirror 34 preferably has a concave or convex curvature which may be, for example, ellipsoid, paraboloid, hyperboloid or hemispherical. Thus, light from the source 40 which impinges on the mirror 34 may be reflected back toward the source 40 or toward the video camera 42 or outwardly in other directions depending upon the particular mirror location on which the light strikes. Moreover, light (from the source 40) illuminating the mirror 34 will be reflected back to the video camera 42 from a certain location on the mirror 34. The particular mirror location which reflects light back to the video camera 42 is determined by the particular angular orientation of the mirror 34 relative to the source 40. Preferably, the mirror 34 has a convex or concave curvature, and, more preferably, the mirror 34 has a convex curvature such that outer lateral portions of the mirror 34 are located more inward i.e., further away from the video camera 42 and medial portions of the mirror are located more outward i.e, closer to the video camera 42. This enables localization of the mirror 34 relative to the video camera 42, as will be described in detail hereinbelow.

Figure 7:
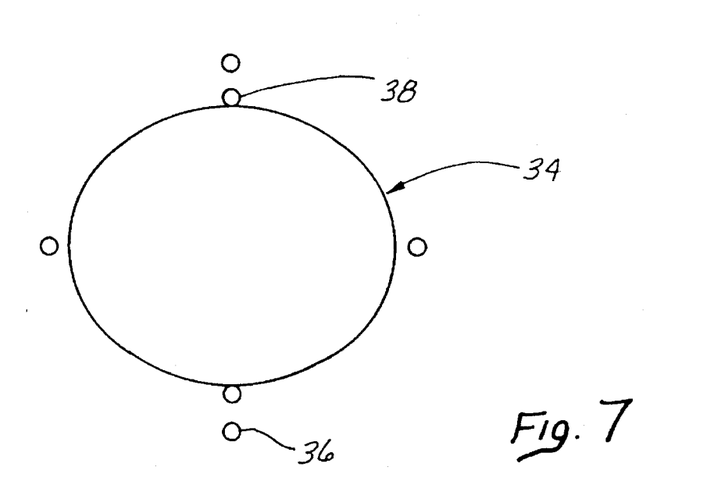
FIG. 7 is a front diagrammatic view of the reflector assembly of the locating subsystem of FIG. 6.
Figure 8:
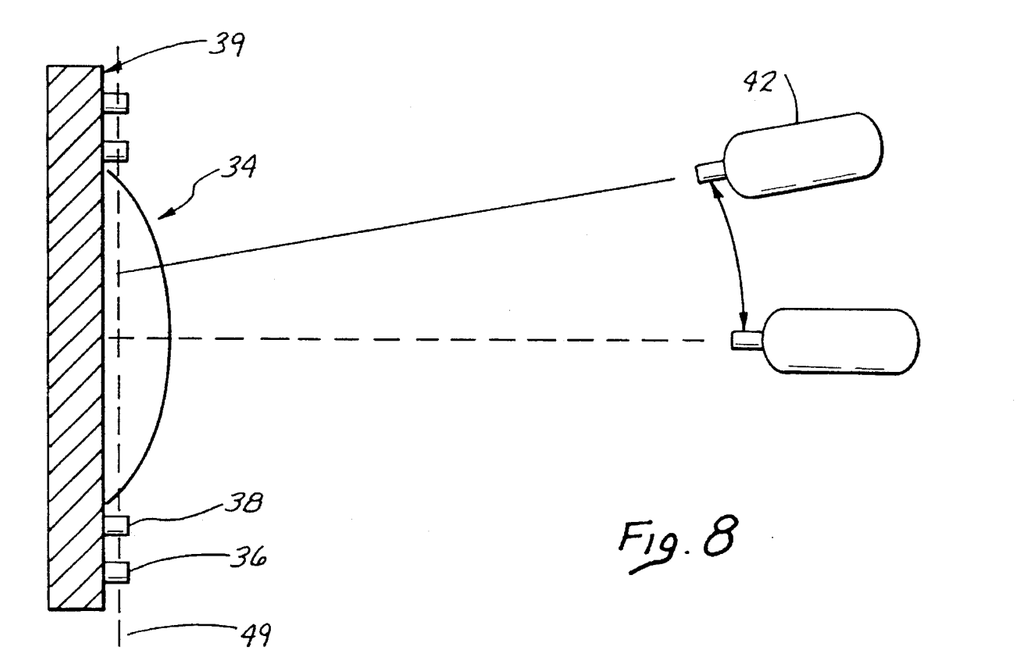
FIG. 8 is a side diagrammatic view of the reflector assembly of the system of the invention showing the relative positioning of the components thereof.

The retroreflectors or calibration markers 36 and 38 are preferably positioned at lateral portions of the mirror 34. The calibration markers 36 and 38 in conjunction with the mirror 34 comprise mirror assembly 39. The calibration markers 36 and 38 are preferably cube mirrors which reflect light therefrom (through a wide angular range) so that the video camera receives reflected light from the markers 36 and 38 within a wide range of lateral viewing angles. There are preferably four pitch and yaw markers 38 equidistantly spaced around the mirror 34 and preferably two roll markers 36 positioned at preferably opposite outer portions of the mirror 34. The roll markers 36 are preferably in general alignment with and adjacent to two oppositely positioned pitch and yaw markers 38. As shown in FIGS. 8, medial curved portions of the mirror 34 preferably generally lie out of the plane 49 of the calibration markers 36 and 38. The medial portions of the mirror 34 are preferably forward of (toward the video camera 42) the plane 49 of the calibration markers 36 and 38. Thus, the various individual reflection points on the curved portion 35 of the mirror 34 in combination with any two of the retroreflectors 36 have a triangular relationship. This relationship which is clue to the unique positioning of the medial portions of the mirror 34 enables calculation of the relevant angles and distances between the mirror assembly 39 and the video camera by means of trigonometric analysis, which will be described in detail hereinbelow.

There are other alternative mirror assembly configurations. For example, the calibrations markers 36 and 38 may instead be flat retroreflector strips (not shown) positioned around the perimeter of the mirror 34 or a circular retroreflector (not shown) with one or more curved mirrors 34 positioned within the circular retroreflector.

The video camera 42 is preferably modified to eliminate automatic gain control functions so that the camera composite video signal and iris settings, etc. are not changed as the light is turned on and off. This prevents bright extraneous light from washing out the desired image of the reflected light from the mirror 34 and from the markers 36 and 38. The video camera 42 thus generally functions as a video-radiometer. The video-radiometer 42 and reflector assembly 39 are preferably oriented so that they generally face each other. The video-radiometer 42 and its components are shown in detail in FIG. 11. The video-radiometer 42 preferably includes a housing 62, a camera or focusing lens 64, a zoom lens subsystem 66, a shutter 68, a CCD image sensor 70, a cable interface 72 (lights for allowing utilization of a mechanization subsystem which is not shown), a power supply 74 and a locating subsystem computer or data processor boards 46.

Figure 11:
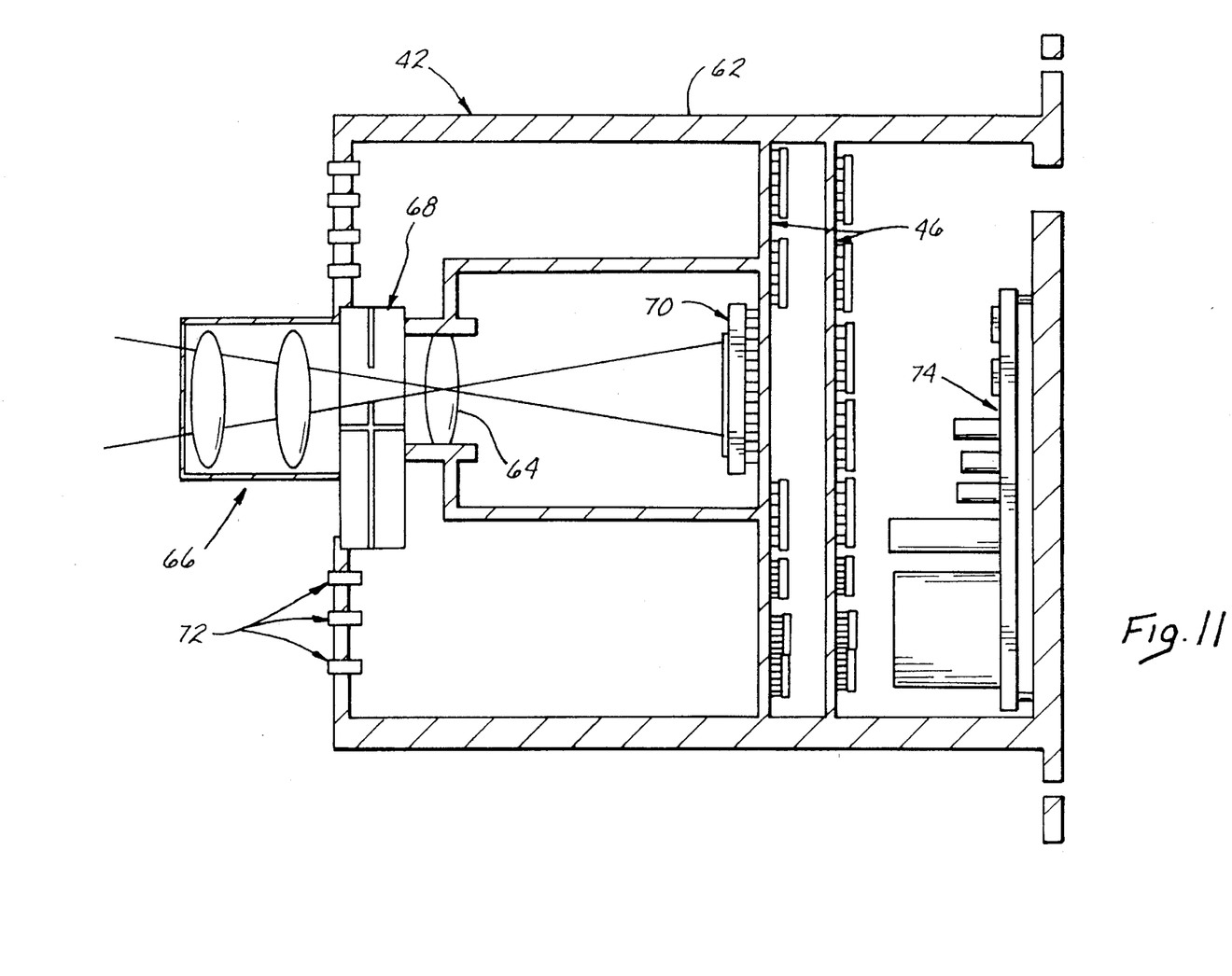
FIG. 11 is a diagrammatic representation of the video-radiometer/processor unit of the locating subsystem of the invention.
Figure 12:
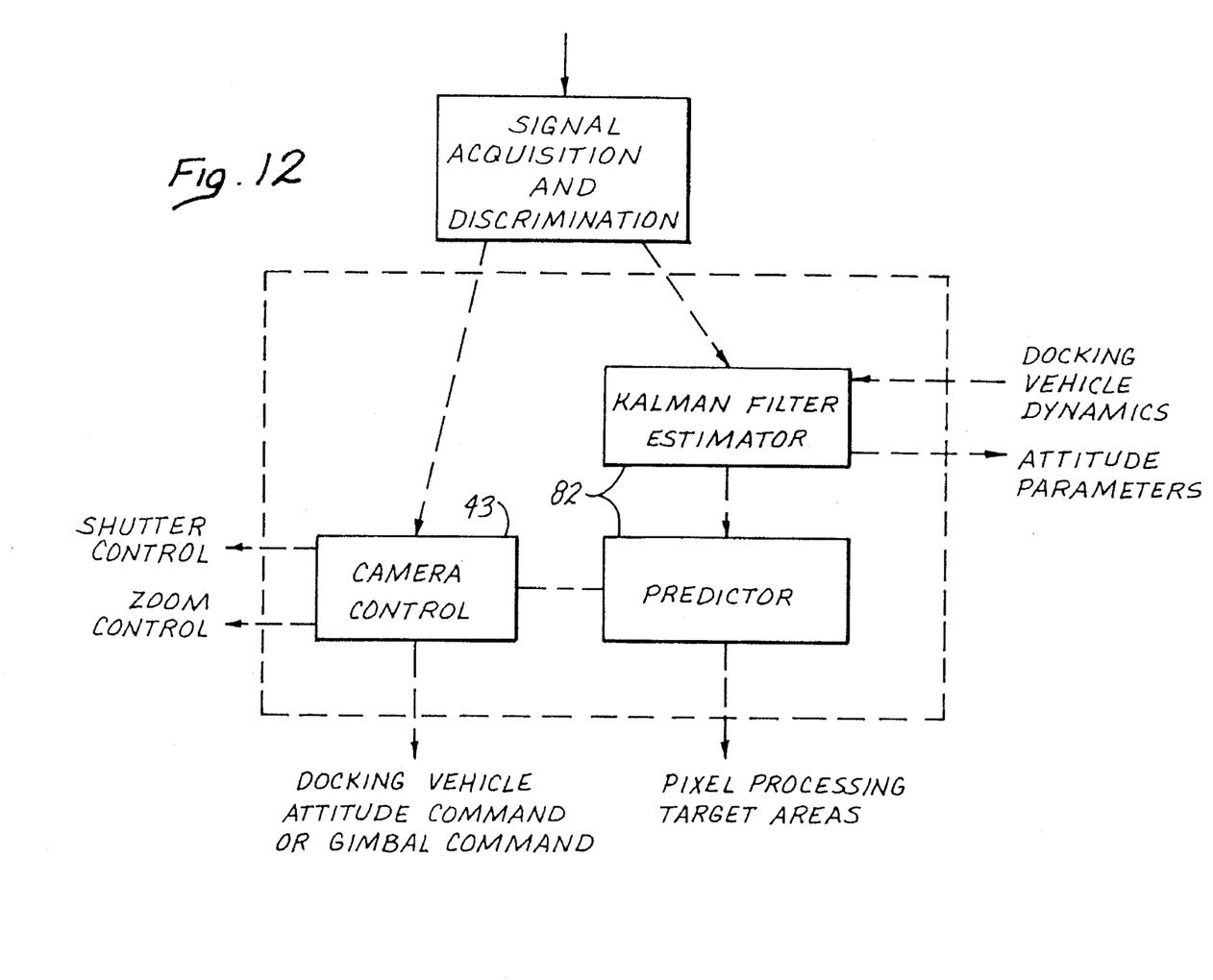
FIG. 12 is a block diagram of the signal processing function of the locating subsystem of the invention.

In operation, the radiometer's shutter 68 is opened by means of radiometer controller 43 to let light from the assembly 39 into the radiometer 42. The lens 64 focuses the light to obtain a focused image on the image sensor 70 which may be a charge coupled device, CCD or other type. The zoom lens 66 controls the field of view to ensure that the image obtained contains the light reflected from the mirror 34 and from the retroreflectors 36. In addition, the zoom lens 66 preferably ensures that the light image from the assembly 39 generally fills the image sensor's field of view to maximize the number of pixels separating the points of light from the assembly 39 thereby improving the accuracy of measurement of the separation distances.

Basically, the video-radiometer measures the number of pixels between the images formed by the light beams to determine the relative distance between the images and their relative configuration as viewed by the radiometer. This measurement in conjunction with the magnification of the received image is used to determine the actual distance between the reflection point on the reflector and the centroid of the retroreflectors. The video-radiometer has an electrical output which includes data relating to the separation of the light images and their configuration (distance from a fixed axis).

Figures 9A, 9B, 9C:
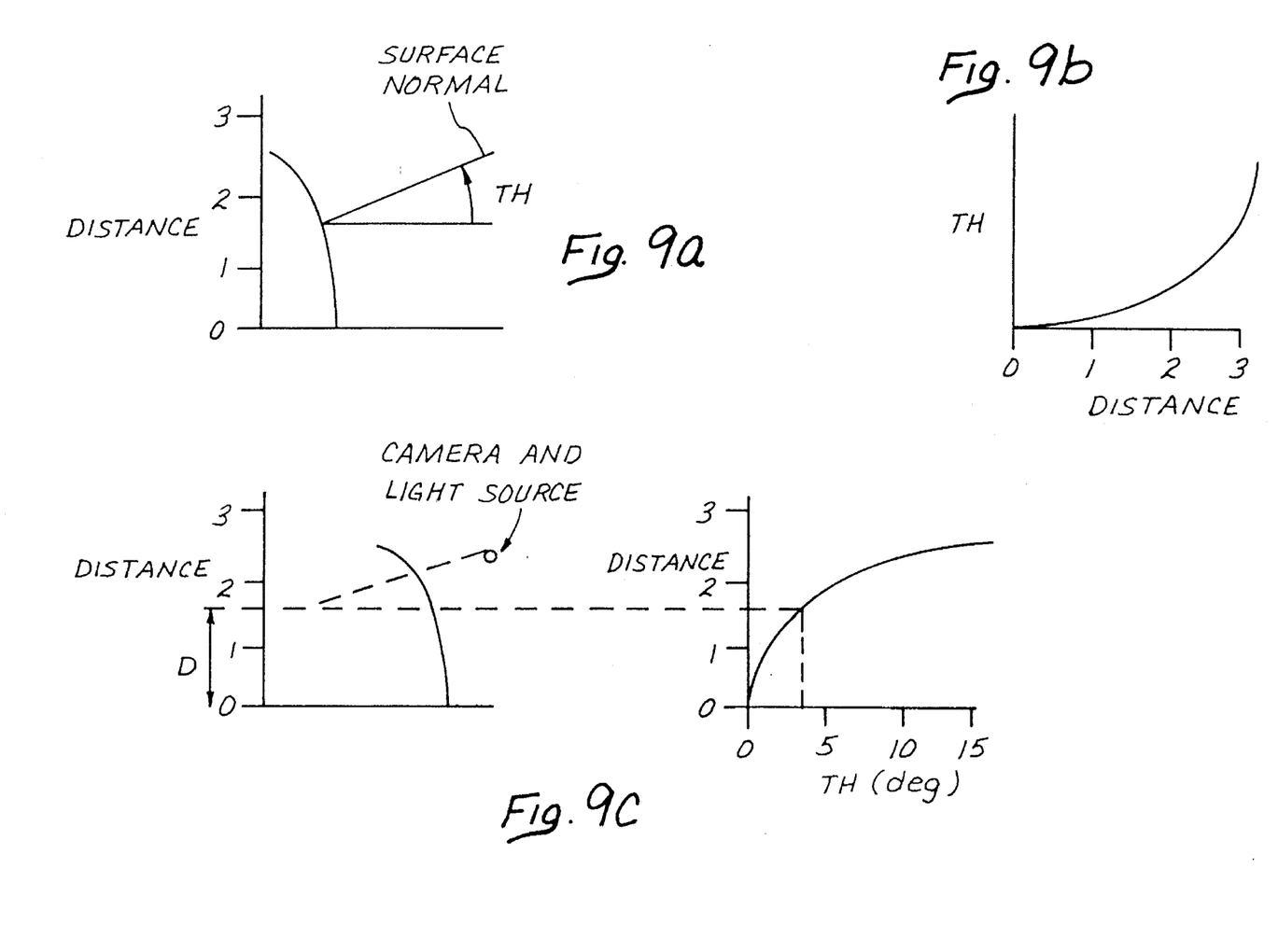
FIG. 9a is a graph showing the relationship between angle of reflection from an ellipsoidal curved surface and distance.
FIG. 9b is another graph also showing the relationship between angle of reflection from an ellipsoidal curved surface and distance.
FIG. 9c is a pair of interconnected graphs also showing the relationship between angle of reflection from an ellipsoidal curved surface and distance.

The data relating to the separation and configuration of the points of light focused on the image sensor 70 is transmitted to the computer or data processor boards 46. The computer 46 utilizes the separation data to calculate pitch, yaw and range of the assembly 39 relative to the video-radiometer (or first aircraft 14) by means of trigonometric formulas. The computer utilizes the configuration data i.e., distance from a fixed axis, to calculate bearing and motion of the assembly 39 relative to the video-radiometer 42 (or first aircraft) by means of trigonometric formulas. These formulas are derived from the triangular relationships which are established by the particular configuration of the mirror 34 and retroreflectors 38 of the assembly 39 and the video-radiometer 42 when the assembly 39 (and/or video-radiometer 42) is positioned within a certain range of angular orientations with respect to the video-radiometer 42. Since the curvature of the mirror 34 is a known factor, the particular angle of orientation of the mirror 34 can be computed once the mirror location from which light is reflected is determined. The mirror location can be determined simply by measuring the separation distance between the point of light reflected from the retroreflectors 38 and the point of light reflected from the mirror 34. Since the mirror curved portion 35 is preferably outside the plane 49 of the retroreflectors 36 and 38,, changing the orientation angle of the assembly 39 so that it is generally turned away from the video-radiometer 42 results in the center of the mirror curved portion 35 moving closer to one of the retroreflectors 38 while also moving further away from another opposing one of the retroreflectors 38 as viewed from the radiometer 42. Because of this same configuration of the mirror curved portion 35 and retroreflectors 38, when the orientation is similarly changed the reflection point on the mirror curved portion 35 also moves closer to one of the retroreflectors 38 while moving further away from the opposing one of the retroreflectors 38 from the perspective of the radiometer 42. The degree to which the reflection location point moves toward and away from the centroids of the retroreflectors 38 depends on the degree and type of curvature of the mirror 34 as well as the distance of the reflection points of the mirror curved portion 35 from the plane. FIGS. 9a, 9b and 9c show the angle of the reflected beam as a function of the distance of the mirror location (from which the beam is reflected) from a reference location. FIGS. 9a, 9b and 9c relate to a reflector assembly having a mirror with an ellipsoid curvature.

Referring to FIGS. 9a, 9b and 9c:

$$\frac{y^2}{A^2} + \frac{x^2}{B^2} = 1$$

$$THA = \tan^{-1} - \frac{dy}{dx} \tan^{-1} \frac{Ax}{B(B^2 - x^2)^{1/2}}$$

where THA is the angle of the surface normal.

Basically, the locating system's determination of the desired position (and indirectly motion) parameters is based primarily upon the principle that a reflective surface must be perpendicular to the path of light from a given source in order for the light to reflect back to the point of origin. If the reflective surface has a known curvature, then the angle of the surface normal is also known as a function of the location on the mirror surface 35. For a light source to be seen by the video-radiometer 42 (or video camera) located at the same point, the reflected light would be perpendicular to the surface 35. Since the video-radiometer 42 can view the light and the curvature of the reflective surface and the size of the reflective surface are known, the video-radiometer calibration constant (pixels unit length) can be calculated for this zoom position and therefore the location of the light reflection point on the surface can be determined. Since the relationship between the distance from a reference location to the light reflection point on the mirror 34 and the light reflection angle are known, the attitude of the mirror 34 with respect to the line-of-sight to the video-radiometer 42 is known. The bearing angle is determined by observing the reflected light position relative to a fixed axis established on the locating system 12. Either the video-radiometer 42 could be fixed, with the lens 64 having a sufficiently wide angle to meet field-of-view requirements, or the video camera 42 could be oriented (pan and tilt) as required to view the receiving aircraft 14.

Figure 10A:
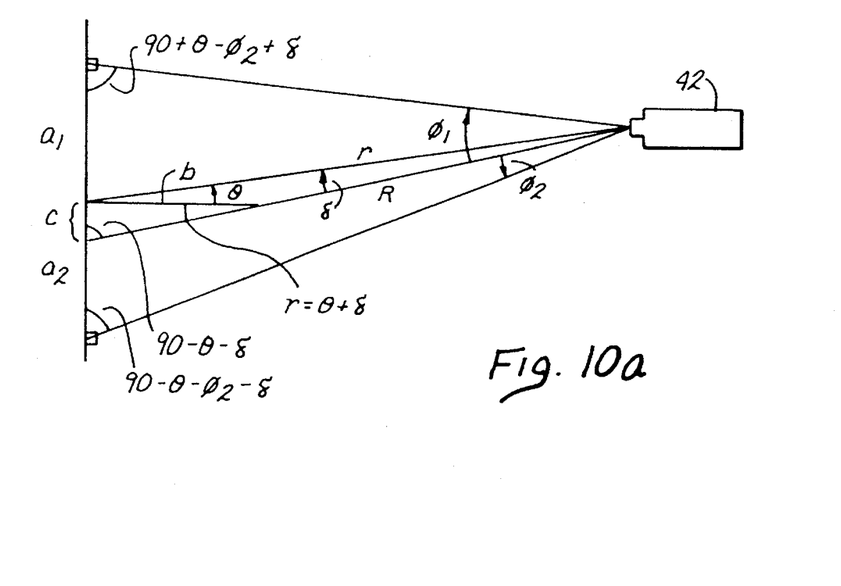
FIG. 10a is a diagram showing the triangular relationships and trigonometric relationships between the reflector assembly which has a hemispherical central reflector and the video-radiometer of the locating system of the invention for one particular angle of orientation of the reflector assembly relative to the radiometer.
Figure 10B:
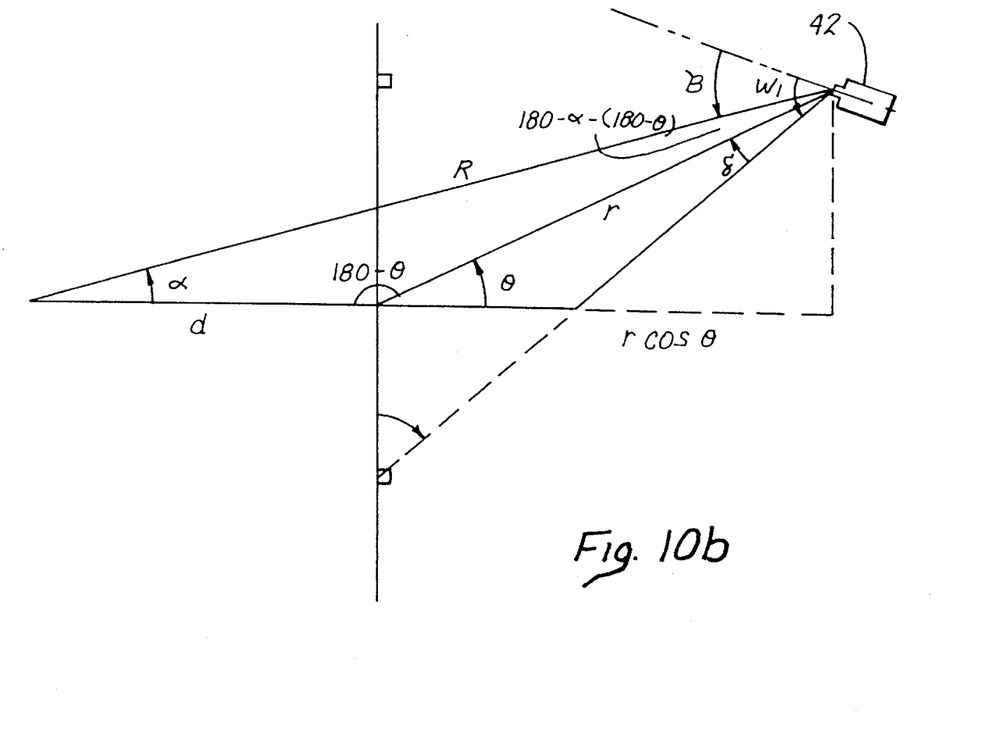
FIG. 10b is a diagram showing the triangular relationships and trigonometric relationships between the reflector assembly which has a hemispherical central reflector and the video-radiometer of the locating system of the invention for another particular angle of orientation of the reflector assembly relative to the radiometer.

FIGS. 10a and 10b show two additional angles of orientation of the assembly 39 relative to the video-radiometer 42 and illustrate the triangles formed by connecting the reflection point on the mirror 34 with the reflection points i.e., centroids, on the retroreflectors 38 and with the video-radiometer 42. FIG. 10a and 10b show the trigonometric relationships for an assembly having a spheroidal central mirror. The trigonometric relationships between the reflection points and the distances between as well as the angles associated therewith allow calculation of the particular angles and particular distances i.e., sides of the triangles, which provide the desired angles of orientation and range of the reflector assembly 39 (and the first aircraft) relative to the video-radiometer 42 (and the second aircraft). The trigonometric formulas utilized to determine the desired position parameters are as follows:

Referring to FIG. 10a where $c = b \tan(\theta + \delta)$ and $\beta = \theta + \delta$ $$\frac{a_1 + c}{\sin \phi_1} = \frac{R}{\sin(90 + \theta - \phi_1 + \delta)} = \frac{R}{\cos(\beta - \phi_2)}$$

$$\frac{a_2 - c}{\sin \phi_2} = \frac{R}{\sin(90 - \beta - \phi_2)} = \frac{R}{\cos(\beta + \phi_2)}$$

$$R = \frac{(a_2 - c)\cos(\beta + \phi_2)}{\sin \phi_2} = \frac{(a_1 + c)\cos(\beta - \phi_2)}{\sin \phi_1}$$

$$\tan \beta = \frac{a_2 \cot \phi_2 - a_1 \cot \phi_1}{a_1 + a_2 + b(\cot \phi_1 + \cot \phi_2)}$$

$$\tan \delta = \frac{a_2 \cos(\beta + \phi_2) \sin \phi_1 - a_1 \cos(\beta - \phi_1) \sin \phi_2}{a_2 \cos(\beta + \phi_2) \cos \phi_2 + a_1 \cos(\beta - \phi_1) \cos \phi_2}$$

$$r = \frac{a_1 \cos(\beta - \phi_1)}{\sin(\phi_1 - \delta)}$$

Referring now to FIG. 10b, the angle can be similarly calculated by means of the equations:

$$\tan \alpha = \frac{r \sin \phi}{d + r \cos \theta}$$

$$\beta = w_1 - \delta - [180 - \alpha - (180 - \theta)]$$

$$\beta = w_1 - \delta + \alpha - \theta$$

and the distance R can be determined by the following equation:

$$R = \frac{(d + r \cos \theta)}{\cos \alpha}$$

Figure 13:
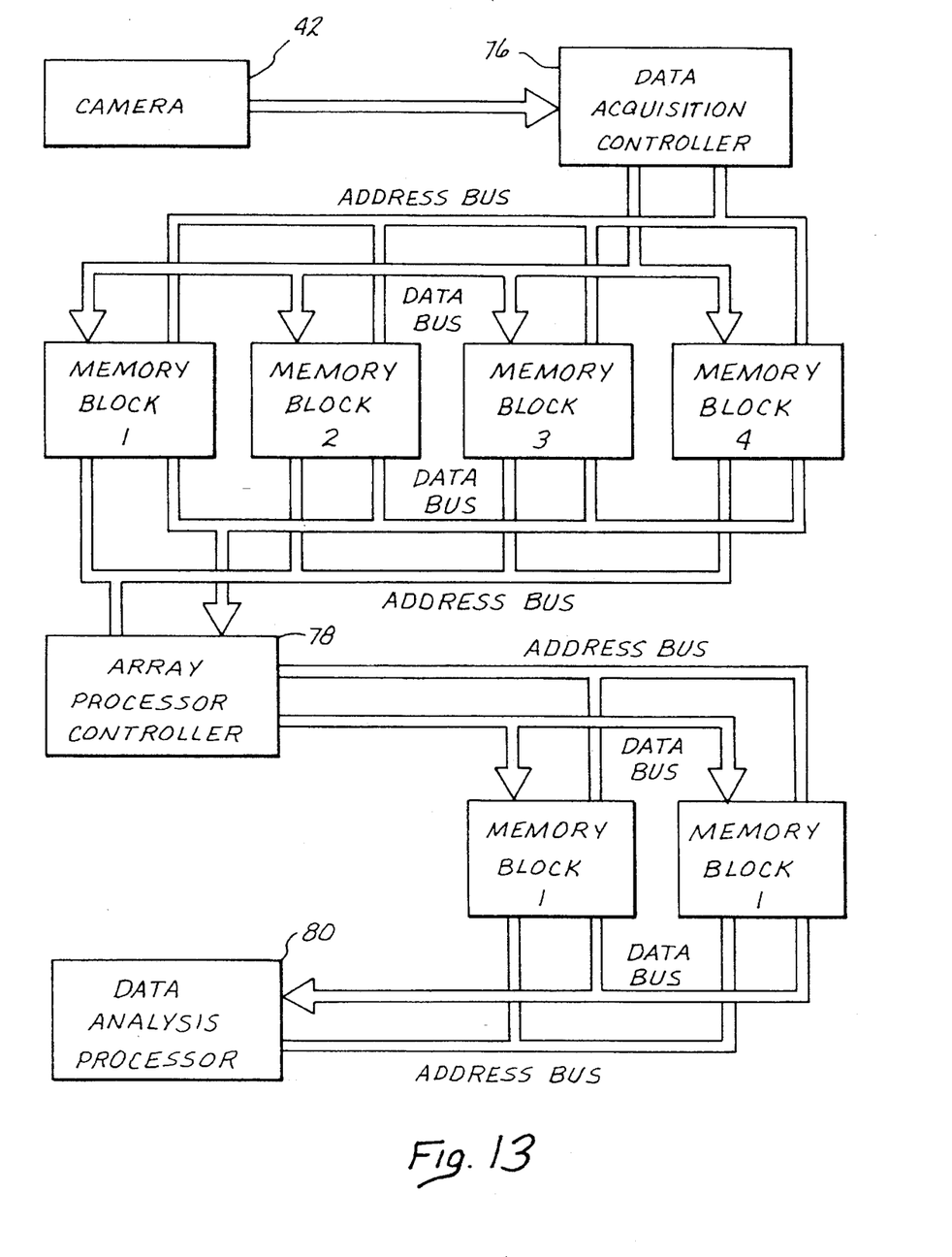
FIG. 13 is a block diagram of the computer memory configuration and data flow of the system of the invention.
Figure 14:
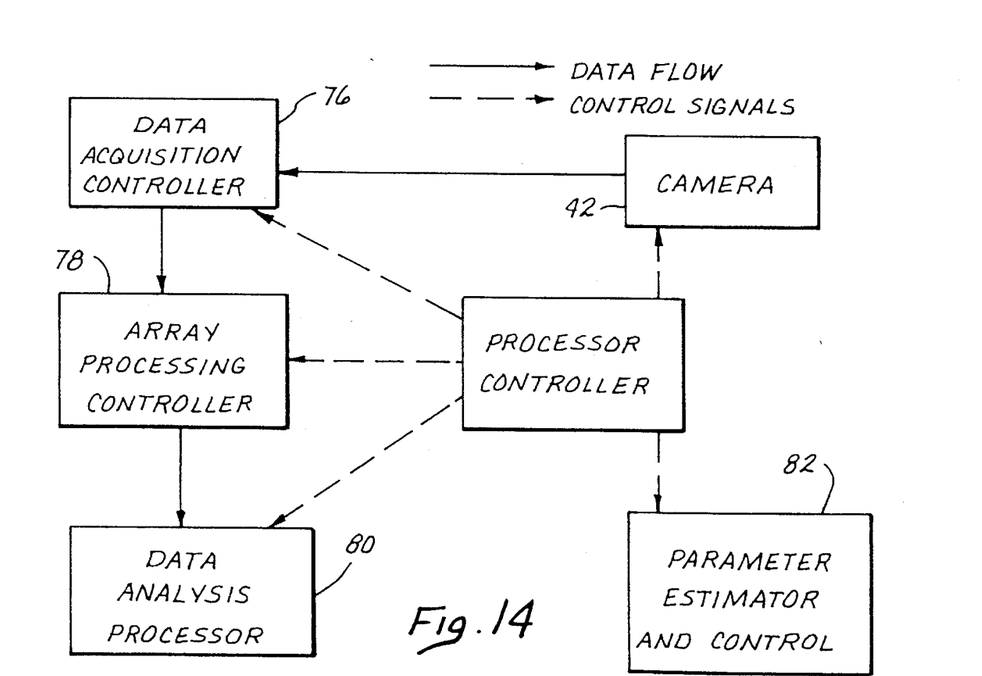
FIG. 14 is a block diagram of the data processing system of the locating subsystem of the invention.

The computer or data processing boards 46 are preferably integral with the video-radiometer 42. However, computer 46 may alternatively be separate from the video-radiometer 42 and communicatingly connected thereto. The computer 46 preferably includes a data acquisition controller 76, an array processor controller 78, a data analysis processor 80 and a parameter estimator and control 82 (see FIG. 14). The computer data acquisition controller 76 receives the data from the sensor 70 which has taken the image data and has shifted it in the registers of the sensor array 70. The data acquisition controller 76 takes the data from the registers, digitizes it and stores it in designated memory banks. The array processor controller 78 also takes data from one memory bank, processes the data and stores it into an analysis memory bank. The controller 78 also subtracts the background image from the light data image on a pixel by pixel basis. The data analysis processor 80 subsequently takes a processed image out of memory and selects target points which are processed to obtain the desired signal information. The parameter estimator and control 82 subsequently calculates the attitude, bearing and range of the assembly 39 and filters the raw measurement data to get the best estimate of the vehicle state. The vehicle state information is transmitted to the main system computer 22 fox integration with the data base information and also to the video-radiometer controller 43 to determine the required video-radiometer attitude angle, video-radiometer zoom position and array processing regions. The parameter estimator and control 82 is shown in FIG. 13, and the data flow through the computer 46 and the memory configuration thereof is shown in FIG. 14. The video-radiometer system is the subject of another patent application Ser. No. 07/999,768 assigned to the assignee of this invention, entitled "Digital Image System For Determining Relative Position And Motion Of In-Flight Vehicles." It is incorporated by reference herein in its entirety.

Figure 15:
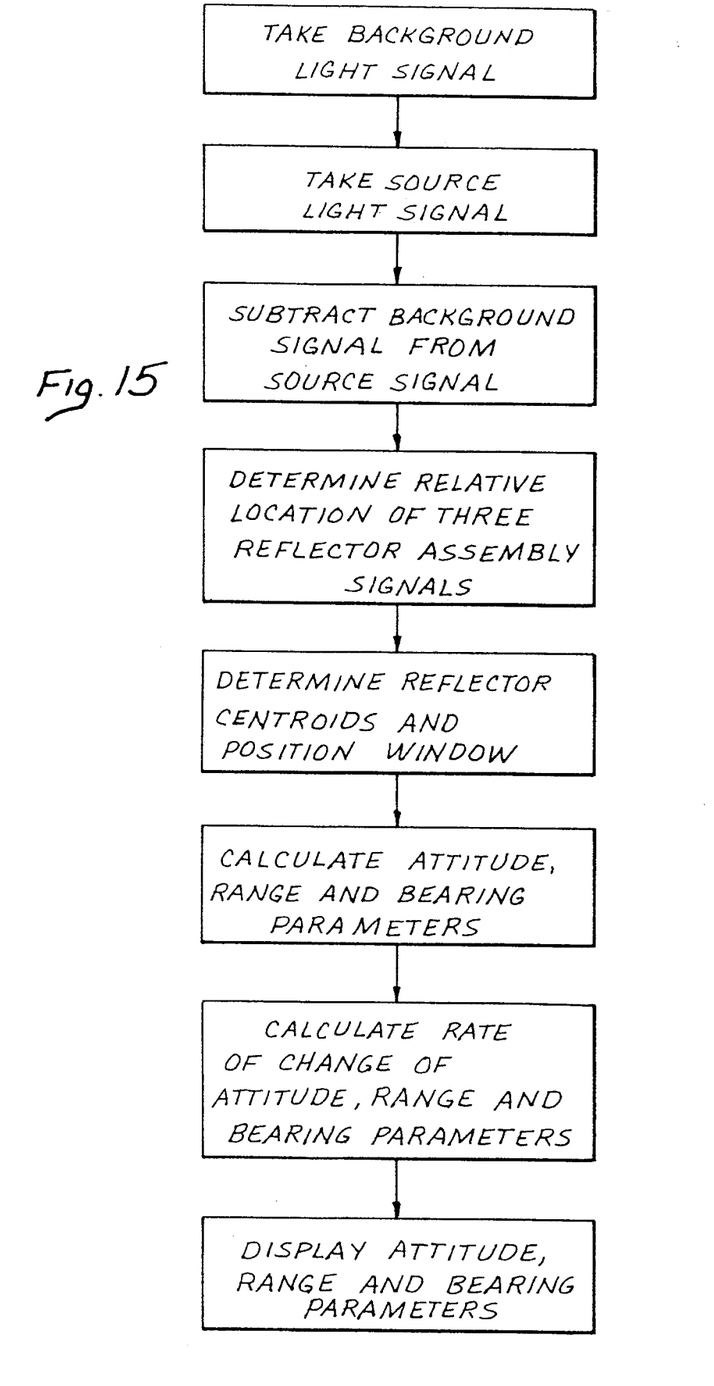
FIG. 15 is a flow chart showing the functional operation of the locating subsystem computer as per the software program of the locating subsystem of the invention.

FIG. 15 is a flow chart showing the functional operation of the computer 46 under the software program of the locating system 12 of the invention. Initially, the software program, after receiving the proper commands from the operator, obtains data to be used for acquisition of the target reflector signal. The software program commands the data acquisition controller 76 to take an image with no light on (background image). Subsequently, the light source 40 is turned on and a second image is taken. The background is subtracted from the signal image. The program detects the three signals in the reflector acquisition data by measuring the signal strengths and determining the three largest signals that are separated by some distance. The logic compares the signal strengths to certain values and finds which of the three signals is the left most signal, the center signal and the right most signal and stores the signal locations in memory. The program obtains the reflector signal data by commanding the data acquisition controller 76 to take a background image (light source 40 off), turning on the light 40, taking another image and turning the light 40 off. The program calculates the mean signal strengths and utilizes the results to calculate the centroids of the retroreflectors 36 and 38. The signal characteristics are all calculated and the centroids are used to calculate the position of the window around the signals. The program subsequently takes the centroid data and calculates the bearing, attitude and range of the reflector target. The program filters the calculations and by taking more data and making more calculations over a period of time calculates the rate of change of these parameters i.e., motion of the reflector assembly 39 and thereby motion of the aircraft 14 relative to the aircraft 16. These calculated parameters of position and motion are subsequently transmitted to the main system computer 22. These desired parameters of the position (and rate of change of position) of the tanker aircraft 16 relative to the receiver aircraft 14 which are fed to the computer 22 are combined by the computer 22 with aircraft size and configuration data in the data base 30 via the computer software program 26 to produce the desired real time, generally three dimensional image on the computer monitor 28.

Although the locating means described utilizes an optical mirror/retroreflector assembly, there are other locating means which may also be suitable for use in the guiding system of the present invention. Generally, any locating means which can provide the desired position and motion parameters in real time and in electrical output form may be suitable. For example, the locating means may utilize a Polhemus sensor and optical fibers to determine the position and motion of a gloved hand and transmit the data via the optical fibers to the computer 22.

The computer 22 is preferably provided with image controls 50 to selectively alter the image characteristics and thereby enhance the visual cues (pertaining to range, relative position and relative motion) provided by the image. The image controls 50 preferably include a brightness contrast control 52, a color control 54, an image texture control 56, an image size control 58 and a perspective (or viewing angle) control 60. The contrast and color controls 52 and 54 allow certain objects depicted to stand out from the background or from other objects so that the operator can more easily discern desired objects. The image texture control 56 allows selection of the surface structure i.e., skin, frame, etc. of the aircraft and structures thereof to simplify the depicted objects or provide a more realistic object depiction. The image size control 58 allows selection of a close up view of selected depicted objects or a distant view of the depicted objects for a more complete view of the entire scene depicted. The perspective control 60 allows selection of the viewing perspective so that the objects depicted may be viewed from any desired angle, for example, the depicted objects may be viewed from the side, top, bottom, front or rear. The perspective control 60 thus allows the operator to obtain a side view of the refueling boom and receptacle so that he can more easily see how close or how distant the boom is from the receptacle thereby enhancing the practical usefulness of the image. This feature is especially unique because other prior art systems do not have this capability i.e., it would not be possible with prior art systems to place a camera where it could provide certain desired perspective viewing angles whereas the system of the present invention is capable of providing such desired perspective viewing angles. Thus, the image controls 50 greatly enhance the operator's ability to guide the refueling structures into a desired mating position.

Accordingly, there has been provided, in accordance with the invention, a computer imaging system and method which fully satisfies the objectives set forth above. It is to be understood that all terms used herein are descriptive rather than limiting. Although the invention has been described in conjunction with a remote inflight aircraft refueling system, it may also be used, for example, for spacecraft/space station docking or spacecraft link up, and many other alternatives, modifications and variations will be apparent to those skilled in the art in light of the disclosures set forth herein. Accordingly, it is intended to include all such alternatives, embodiments, modifications and variations that fall within the scope of the invention as set forth in the claims hereinbelow.

What is claimed is:

1. A system for mating desired structures of moving vehicles, comprising:

a locating means for accurately determining the three dimensional position and orientation of a first structure of a first vehicle relative to a second structure of a second vehicle, said locating means having an electrical output which includes position and orientation data;

a display terminal; and a data processor operably connected to said display terminal, said data processor having a data base including three dimensional configurational data related to said first and second vehicles and being adapted to receive said locating means output and to process said output and the data in said data base to produce an artificial real-time three dimensional image on said display terminal of elements of said first and second structures and said first and second vehicles;

wherein said image may be utilized by a mating system operator to guide said first and second vehicles to a desired mating position.

2. The system as recited in claim 1, and further comprising a means for controlling said image in order to enhance visual cues received therefrom.

3. The system as recited in claim 2, wherein said means for controlling includes a color control for controlling the colors of desired structures and vehicles in the image.

4. The system as recited in claim 2, wherein said means for controlling includes a brightness contrast control for controlling the brightness contrast of desired structures and vehicles in the image.

5. The system as recited in claim 2, wherein said means for controlling includes an angle control for selecting any observation angle of vehicles and structures depicted in the image.

6. The system as recited in claim 2, wherein said means for controlling includes means for selecting desired elements of said vehicles and structures for depiction in said image, and for de-selecting elements of said vehicles and structures which are unnecessary to the mating function.

7. The system as recited in claim 1, wherein said data base includes configurational data for all vehicles and structures anticipated to be mated.

8. The system as recited in claim 1, wherein the operator of said system is not provided with a direct, real image of the structures to be mated.

9. The system as recited in claim 1, said locating means comprising a reflector assembly on one of said two vehicles.

10. The system as recited in claim 9, said locating means further comprising an electromagnetic radiation source on the other of said two vehicles.

11. The system as recited in claim 9, wherein said reflector assembly further comprises a mirror, roll calibration markers, and pitch and yaw calibration markers.

12. The system as recited in claim 11, wherein said mirror has a curvature.

13. The system as recited in claim 10, wherein said locating means further comprises a video camera, a video monitor, and a beam splitter positioned on the other of said two vehicles.

14. A system for in-flight aircraft refueling, comprising:

a locating means for accurately determining the three dimensional position and orientation of a first structure of a first aircraft relative to a second structure of a second aircraft, said locating means having an electrical output which includes position, orientation, and motion data;

a display terminal; and a data processor operably connected to said display terminal, said data processor having a data base including three dimensional configurational data related to said first and second vehicles and being adapted to receive said locating means output and to process said output and the data in said data base to produce an artificial real-time three dimensional image on said display terminal of elements of said first and second structures and said first and second vehicles;

wherein said image may be utilized by a mating system operator to guide said first and second vehicles to a desired mating position.

15. The refueling system as recited in claim 14, wherein said first aircraft is a tanker aircraft, said second aircraft is the aircraft to be refueled, said first structure is a refueling boom, and said second structure is a boom receptacle.

16. The refueling system as recited in claim 14, and further comprising a means for controlling said image in order to enhance visual cues received therefrom.

17. The refueling system as recited in claim 16, wherein said controlling means controls texture of surfaces of the structures and aircraft depicted in the image, thereby allowing depiction of any selected exterior and interior portions of the structures and of the aircraft, the image not utilizing a direct view image of the structures or the aircraft.

18. The refueling system as recited in claim 14, wherein said locating means determines motion of the first structure relative to the first and second aircraft and of the second structure relative to the first and second aircraft by utilizing trigonometric analysis of triangular relationships between the structures and the aircraft.

19. The refueling system as recited in claim 14, wherein said locating means locates position and orientation of the first aircraft relative to the second aircraft by utilizing trigonometric analysis of triangular relationships between the structures and the aircraft, said orientation data including parameters of pitch, yaw and roll of the first structure relative to the second structure and of the first aircraft relative to the second aircraft.

* * * * *